(12) United States Patent
Martens et al.

(10) Patent No.: US 7,450,485 B2
(45) Date of Patent: Nov. 11, 2008

(54) ADDITIONAL DATA CHANNEL IN BETWEEN MARKS

(75) Inventors: Hubert Cécile François Martens, Eindhoven (NL); Erwin Rinaldo Meinders, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 345 days.

(21) Appl. No.: 10/540,705

(22) PCT Filed: Nov. 28, 2003

(86) PCT No.: PCT/IB03/05586

§ 371 (c)(1), (2), (4) Date: Jun. 24, 2005

(87) PCT Pub. No.: WO2004/059621

PCT Pub. Date: Jul. 15, 2004

(65) Prior Publication Data

US 2006/0062109 A1    Mar. 23, 2006

(30) Foreign Application Priority Data

Dec. 30, 2002    (EP)    ................................ 02080592

(51) Int. Cl. *G11B 7/007* (2006.01)

(52) U.S. Cl. .................................................. 369/59.25
(58) Field of Classification Search ........................ None
See application file for complete search history.

(56) References Cited

U.S. PATENT DOCUMENTS

| | | | | |
|---|---|---|---|---|
| 5,608,718 A * | 3/1997 | Schiewe | .................. | 369/275.4 |
| 5,751,690 A * | 5/1998 | Ohira et al. | ............... | 369/275.3 |
| 6,061,319 A * | 5/2000 | Fujiki | ....................... | 369/59.21 |
| 6,078,552 A * | 6/2000 | Yamamoto et al. | ....... | 369/47.51 |
| 6,147,945 A | 11/2000 | Takeda et al. | | |
| 6,425,098 B1 * | 7/2002 | Sinquin et al. | .............. | 714/699 |
| 6,587,948 B1 * | 7/2003 | Inazawa et al. | ............. | 713/193 |
| 6,963,529 B1 * | 11/2005 | Kobayashi et al. | ....... | 369/59.24 |
| 2002/0048225 A1 | 4/2002 | Shinoda | | |

\* cited by examiner

Primary Examiner—William J. Klimowicz
Assistant Examiner—Michael V Battaglia

(57) ABSTRACT

A device has a head for recording information by writing marks in a track on a record carrier via a beam of radiation. The radiation is controlled to write the marks having a main mark intensity and a mark length within a predefined range of mark lengths. Further, secondary marks are recorded in the same part of the track. The secondary marks have a secondary mark intensity that is substantially different from the main mark intensity and a length substantially longer than mark lengths in the predefined range. Furthermore, a record carrier, method of recording and a read device are described.

9 Claims, 4 Drawing Sheets

Figure 3:
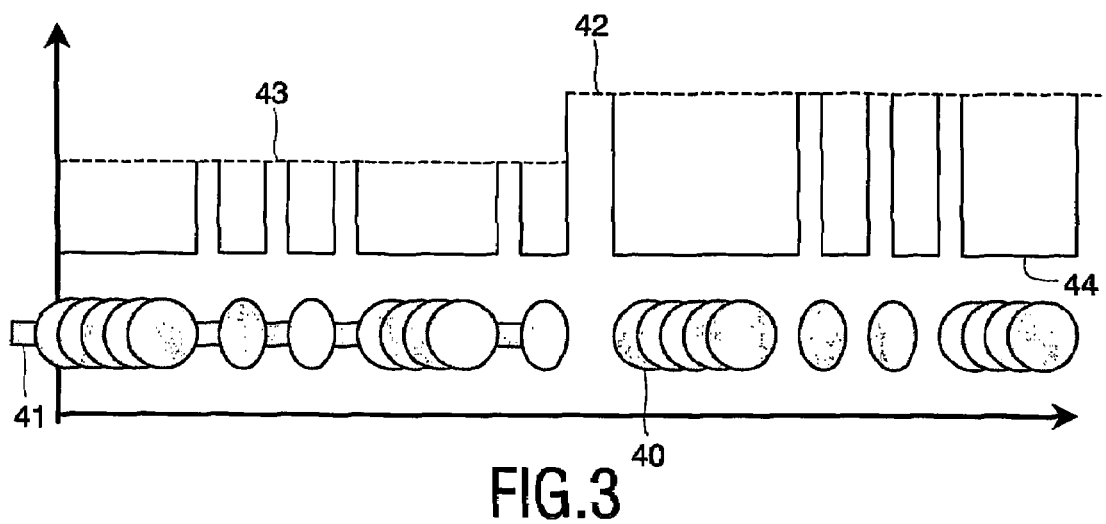

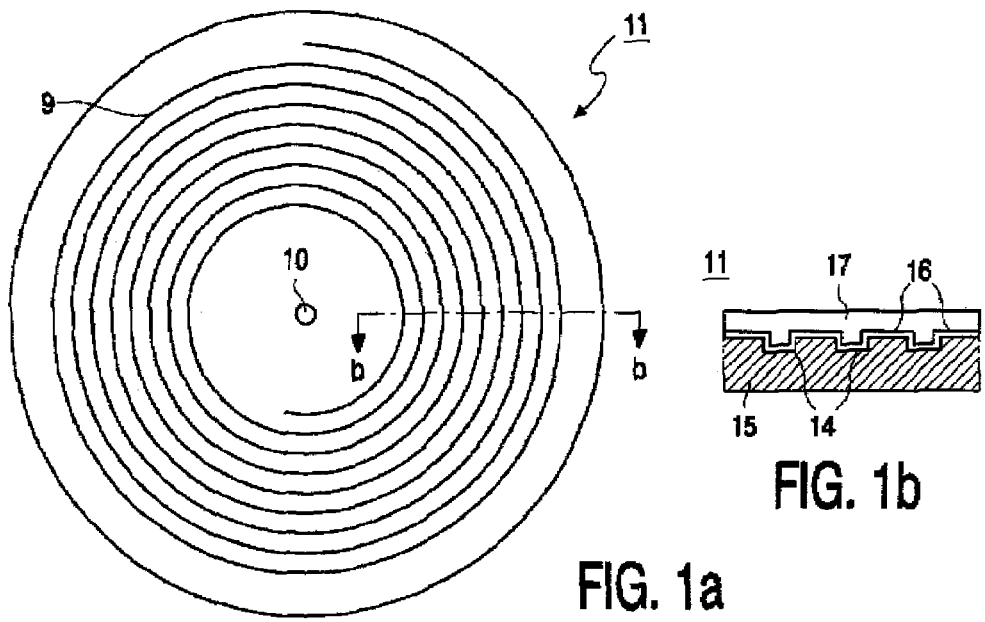
FIG. 1b
FIG. 1a
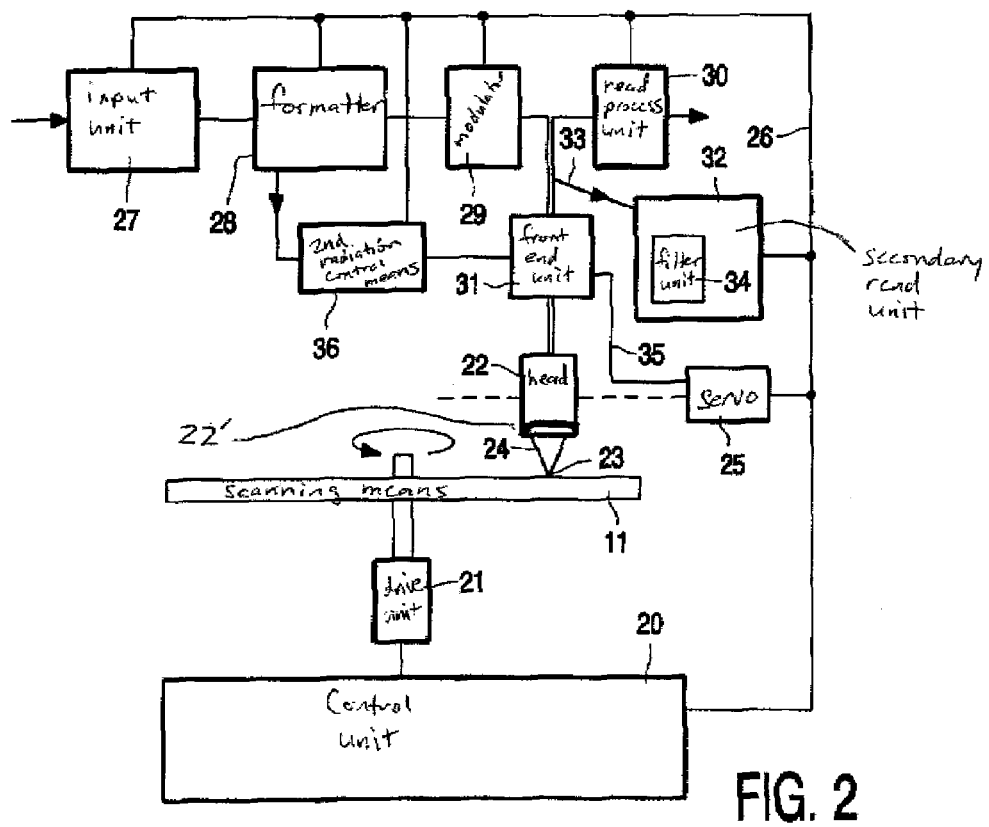
FIG. 2

ADDITIONAL DATA CHANNEL IN BETWEEN MARKS

The present system relates to a device for recording information by writing marks in a track on a record carrier via a beam of radiation.

The present system further relates to a record carrier, a method for writing the record carrier and a device for reading the record carrier.

A system for recording information comprising a record carrier, a recording method and a playback device, is known from U.S. Pat. No. 5,724,327. The record carrier comprises tracks in which the information is represented in a predefined manner by optically readable marks of first variations of a first physical parameter, such as the reflectivity of the scanned surface. The track further has second variations of a second physical parameter, such as a periodic excursion of the track in a transverse direction (further denoted as wobble), a variation in depth, shape or width of the marks. The second variations are modulated and the modulation pattern represents additional information, e.g. a code which is used for recovering the information. For example a de-scramble code is included for recovering information stored as scrambled information. The playback device comprises reading means for reading the optical marks and demodulation means for retrieving the code from the modulation of the second variations. The player comprises data processing means for reproducing the information in dependence on the retrieved code. A problem of the known system is that the additional information is coupled to the presence of marks; in particular the method is not available for unrecorded record carriers.

Therefore, it is an object to provide a record carrier, a device and method having a more versatile way of providing additional information to a user.

According to a first aspect of the present system, an object is achieved with a device as defined in the opening paragraph, the device comprising a head for providing the beam, radiation control means for controlling the beam to write the marks in a selected part of the track, the marks having a main mark intensity and a mark length within a predefined range of mark lengths, and secondary radiation control means for controlling the beam to write secondary marks in the same selected part of the track, the secondary marks having a secondary mark intensity that is substantially different from the main mark intensity and a length substantially longer than mark lengths in the predefined range.

According to a second aspect of the present system, an object is achieved with a record carrier carrying information represented by marks in a track, the marks in at least a part of the track having a main mark intensity and a mark length within a predefined range of mark lengths, and the same part of the track further comprising secondary marks having a secondary mark intensity that is substantially different from the main mark intensity, and the secondary marks having a length substantially longer than mark lengths in the predefined range.

According to a third aspect of the present system, an object is achieved with a method of recording information by writing marks in a track on a record carrier via a beam of radiation, the method comprising the steps of controlling the beam to write the marks in a selected part of the track, the marks having a main mark intensity and mark lengths within a predefined range of mark lengths, and controlling the beam to write secondary marks in the same selected part of the track, the secondary marks having a secondary mark intensity that is substantially different from the main mark intensity and a length substantially longer than mark lengths in the predefined range.

According to a fourth aspect of the present system, an object is achieved with a device for reading information represented by marks and additional information represented by secondary marks from a track on a record carrier via a beam of radiation, the marks having a main mark intensity and mark lengths within a predefined range of mark lengths, the secondary marks having a secondary mark intensity that is substantially different from the main mark intensity and a length outside the predefined range of mark lengths, and the marks and the secondary marks being in the same selected part of the track, the device comprising a head for providing the beam, a front-end unit for generating a scanning signal for detecting marks and secondary marks during said scanning, and a read processing unit for retrieving the information from the scanning signal, and a secondary read unit for retrieving additional information encoded in the secondary marks from the scanning signal.

The effect is that secondary marks which are substantially longer and less intense than the main marks are recorded in the same part of the track as the marks. The secondary are independently formed, and not as an additional variation of the main marks. This has the advantage that it is possible to record the marks before of after recording the secondary marks, in addition to the possibility to record the main and secondary marks simultaneously. Furthermore, the difference in intensity and length allows the marks and the secondary marks to be detected independently.

In an embodiment of the device, the secondary radiation control means are adapted for controlling the beam to write only secondary marks in the selected part of the track. This has the advantage that the secondary marks can be written before or after writing the main marks.

In another embodiment of the device, the secondary radiation control means are adapted for controlling the beam to create the combination of the marks in which marks located at an area of track having a secondary mark, have a main mark intensity different from the main mark intensity of marks located at an area of the track not having a secondary mark, in particular the difference being such that in a scanning signal a level difference between marks and intermediate spaces is substantially equal at both areas of the track. The effect is that the main mark intensity, e.g. by controlling the width, depth or blackness of the main marks, is adapted corresponding to the areas having secondary marks. This has the advantage that the reflection difference between marks and intermediate spaces between areas having and not having secondary marks is reduced.

In an embodiment of the record carrier, said different secondary mark intensity is constituted by the secondary marks being effectively narrower than the marks. This has the advantage that the intensity of the reflected radiation of a secondary mark is different from a recorded mark, and also different from an unrecorded area.

Further embodiments of the device, record carrier and method according to the present system are given in the further claims.

Figure 4:
Figure 5:
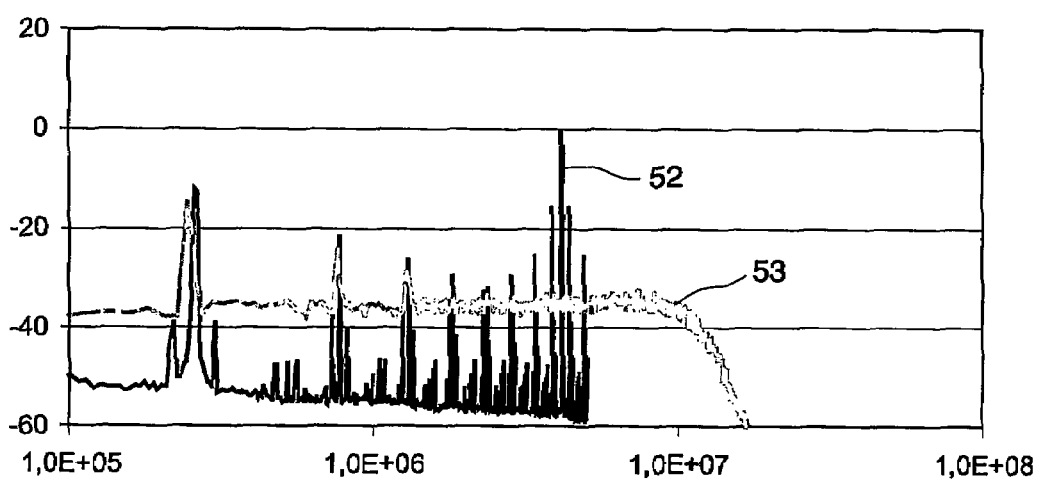
Figure 6:
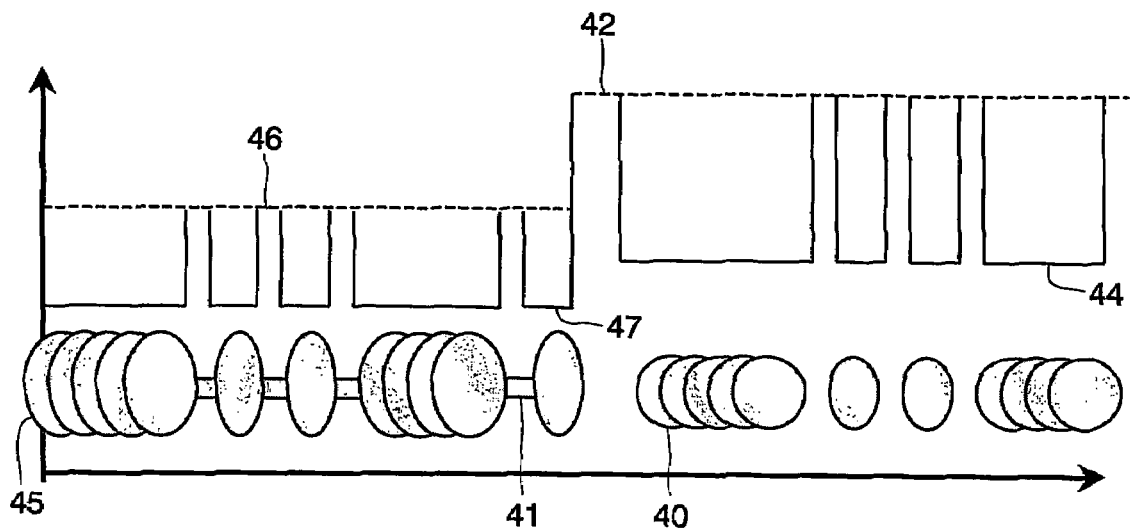
Figure 7:
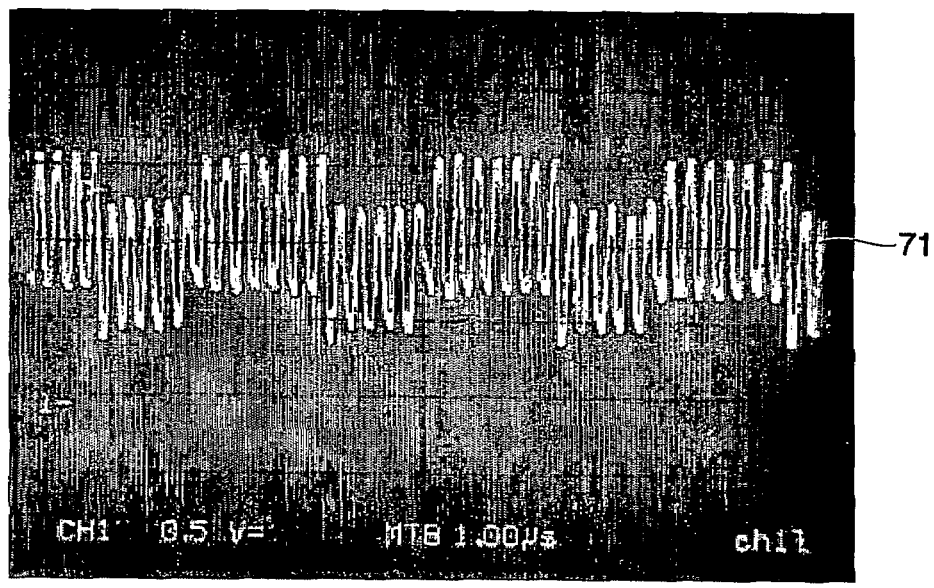
Figure 8:
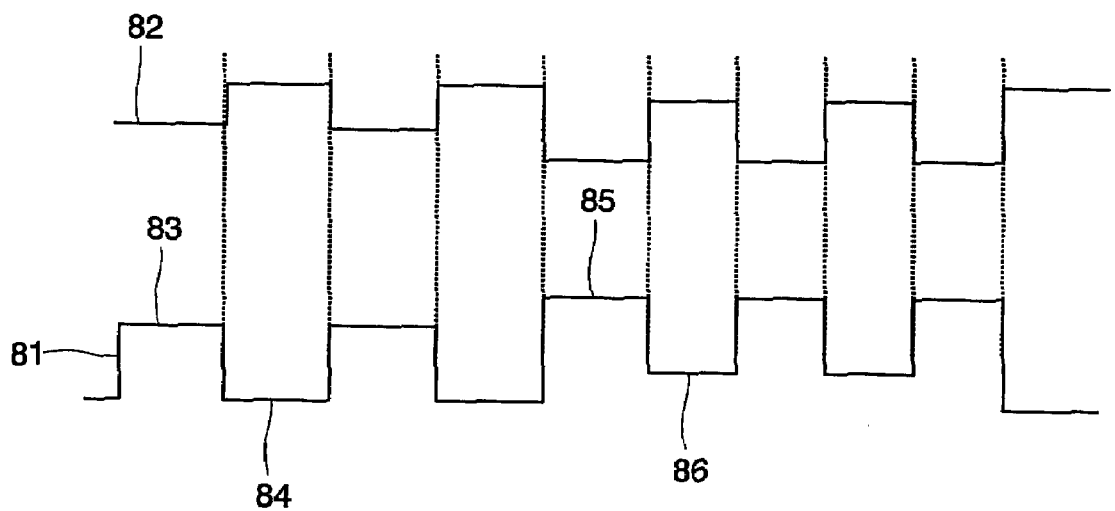

These and other aspects of the present system will be apparent from and elucidated further with reference to the embodiments described by way of example in the following description and with reference to the accompanying drawings, in which FIG. 1a shows a disc-shaped record carrier, FIG. 1b shows a cross-section of a record carrier, FIG. 2 shows a scanning device for recording and/or reading marks and secondary marks, FIG. 3 shows secondary marks and reflection levels, FIG. 4 shows a practical example of intensity of marks and secondary marks, FIG. 5 shows a power spectrum of a written track, FIG. 6 shows secondary marks, adapted main marks and reflection levels, FIG. 7 shows reflection of secondary marks and adapted main marks, and FIG. 8 shows a write strategy.

In the Figures, elements which correspond to elements already described have the same reference numerals.

FIG. 1a shows a disc-shaped record carrier 11 having a track 9 and a central hole 10. The track 9 is arranged in accordance with a spiral pattern of turns constituting substantially parallel tracks on an information layer. The record carrier may be an optical disc having an information layer of a recordable type. The track 9 on the recordable type of record carrier is indicated by a pre-embossed track structure provided during manufacture of the blank record carrier, for example a pregroove. Recorded information is represented on the information layer by optically detectable marks recorded along the track. The marks are constituted by variations of a first physical parameter and thereby have different optical properties than their surroundings, e.g. variations in reflection. Examples of a recordable disc are the CD-R or DVD+R using dye material, and the CD-RW or the DVD+RW using phase change material. In an embodiment the record carrier is of a read-only type in which the marks are represented by pits, for example manufactured by pressing.

FIG. 1b is a cross-section taken along the line b-b of the record carrier 11 of the recordable type, in which a transparent substrate 15 is provided with a recording layer 16 and a protective layer 17. The track structure is constituted, for example, by a pregroove 14 which enables a read/write head to follow the track 9 during scanning. The pregroove 14 may be implemented as an indentation or an elevation, or may consist of a material having a different optical property than the material of the pregroove. The pregroove enables a read/write head to follow the track 9 during scanning. A track structure may also be formed by regularly spread sub-tracks which periodically cause servo signals to occur. The record carrier may be recorded with main information represented by marks, e.g. real-time information like video or audio information, or other information, such as computer data.

Writing and reading of information for recording on optical disks and formatting, error correcting and channel coding rules are well-known in the art, e.g. from the CD or DVD system. Binary data is encoded via run length modulation. Sequences of alternating pits and lands (or amorphous marks and crystalline spaces) represent the binary data. An optical beam is used for reading and writing the data, and the diffraction limited spot size determines the bit length and thus the maximum achievable data capacity on a disc. For example, for the current BD (Blu-ray Disc) system, a bit length of about 75 nm results in a total disc capacity of 25 Gbyte if a 12 cm disc is used as data carrier.

According to the present system, the record carrier is recorded also by secondary marks constituting an additional data channel carrying auxiliary information as elucidated below. The secondary marks result in a different intensity modulation of the amplitude of the HF-signal, and have a frequency range different from the range of the main marks. The difference in reflection does not substantially affect the content or quality of the HF-data. Thus discs incorporating such an additional data stream can still be read back on existing systems, although without retrieving the additional data. In an embodiment, the frequency range of the secondary marks is substantially non-overlapping with the frequency range of a modulation of the pregroove, e.g. the usual wobble modulation. This reduces interference of the additional data channel with the wobble modulation.

It is noted that the auxiliary information may be used for control information that is processed in the scanning apparatus or a host computer, e.g. a code for accessing recorded information, an identifier to support copy-control, anti-piracy information and other accessing mechanisms. The control information in the additional data channel may represent a unique identification code, to protect illegal copying or a watermark. In an embodiment the additional data channel is made available for the user. The auxiliary information may be a software program, e.g. for processing, de-compressing or editing audio or video material, or a 'freeware' type version of a software program for the user to try out the functions of said software. In an embodiment, the auxiliary information is audio or video content information, such as a trailer of a movie or an MP3 version of some audio. In a system where the recording apparatus is not freely available the additional channel can be used to protect data against copying. For example, the secondary marks may be pre-recorded during production of the record carrier by an industrial type recording system, for example for small scale production numbers, or applied via a mask or mastering type of manufacturing process.

FIG. 2 shows a scanning device for recording and/or reading marks and secondary marks. The device is provided with means for scanning a track on a record carrier 11 which means include a drive unit 21 for rotating the record carrier 11, a head 22, a servo unit 25 for positioning the head 22 opposite the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises a focusing actuator 22' for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading, the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled to the servo unit 25 for controlling said tracking and focusing actuators. The main scanning signal 33 is processed for detecting the main digital information from the marks by read processing unit 30 of a usual type including a demodulator, deformatter and output unit.

The control unit 20 controls the scanning and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits. In a further embodiment, the control unit performs the functions of processing the additional information for accessing the main information as indicated above, and/or recording functions described below.

The device comprises a secondary read unit 32 for detecting secondary marks in the scanning signal as follows. The main scanning signal 33 is received from the front-end unit 31. Components in the signal 33 due to the marks of the main information are removed and components due to the secondary marks are isolated, e.g. by a filter unit 34 that has a low pass or band pass function. Timing recovery for reconstructing a data clock of the auxiliary data signal can be based on a wobble frequency or on the secondary marks signal components. In a further embodiment, timing recovery is based on the data clock retrieved for the main data. Synchronous detection can be applied for detecting the data bits of the auxiliary data. In a further embodiment the additional data channel is provided with a channel code and/or error correction codes, and the secondary read unit 32 is provided with a channel code demodulator and an error correction unit.

The read processing unit includes a demodulator circuit like a slicer for demodulating the read signal into digital bit values. It is noted that a quick slicer can accommodate the variations caused by the secondary marks without further modification, in particular when the secondary marks cause a relatively small amplitude difference (e.g. 15%). In an embodiment the read processing unit 30 is adapted to detect the marks from the main scanning signal in the presence of signal components caused by the secondary marks. For example, the unit may include a filter unit for substantially blocking the frequency range of the secondary mark signal components. In an embodiment the read processing unit is coupled to the secondary read unit for receiving a secondary mark signal indicative of detected secondary marks. The secondary mark signal is combined with the main scanning signal, e.g. subtracted, in order to substantially eliminate the secondary mark signal components. Alternatively, the slicer level of a bit detector unit may be adapted to the detected average reflection level as affected by the secondary marks.

In a further embodiment, the front-end unit 31 has a combination circuit that adds signals from several detectors for generating as a scanning signal a mirror signal indicative of the amount of radiation from a radiation beam reflected via the track. In a further embodiment, the combination circuit combines signals from every available detector segment. Such a signal indicative of the total reflection may be coupled separately to the secondary mark unit 32.

In a further embodiment, the device is a recording device which is provided with means for recording information on a record carrier of a type, which is writable or re-writable, for example CD-R or CD-RW, or DVD+R, DVD+RW or BD. The recording device comprises write processing means for processing the input information to generate a write signal to drive the head 22, which means comprise an input unit 27, and modulator means comprising a formatter 28 and a modulator 29. The modulator 29 is coupled to a front end unit 31 constituting radiation control means for writing information. The radiation of the beam is controlled (usually called a recording strategy) to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of polarization different from their surroundings, obtained when recording in magneto-optical material. In a further embodiment, the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The recording device is provided with a secondary radiation control means 36 for controlling the beam 22 via the front end unit 31 to write secondary marks. Additional information to be encoded in the secondary marks may be provided by the formatter 28 and/or via the control lines 26. The mark width for secondary marks is controlled by controlling the write power as discussed below. In a further embodiment, the radiation beam is controlled by a fast switching optical element, for example to change the numerical aperture of the objective lens, and thus the spot size in the radial direction. For example, a switching optical element in the form of a liquid crystal cell (LC) is described for adapting the numerical aperture (NA) in "Japan Journal of Applied Physics 36, p. 481 (1997)" and an LC cell for correcting aberration in "Japan Journal of Applied Physics 38, p. 1744 (1999)". Usually such elements are used for improving the quality of the scanning spot, but they can be switched to cause a blurred spot for writing broader marks. In a further embodiment, switching the optical elements is combined with a recording strategy for adapting the laser power of the radiation beam. As a result, the secondary marks have a secondary mark intensity that is substantially different from the main mark intensity used for the main marks that represent the main information as further elucidated with reference to FIGS. 3 to 7. The main marks have mark lengths in a predefined range, as determined by a channel code. For example, in CD the marks have lengths of 3 to 11 channel bits lengths corresponding to main data clock periods. The secondary marks have a length substantially longer than the longest main mark in order to be separable during detection. A secondary mark length in the range starting at around 100 channel bit lengths allows easy separation. However, using sophisticated signal processing in the secondary read unit 32 shorter secondary marks can be used for increased data capacity of the additional data channel. It is to be noted that the secondary marks are recorded in the same part of the track as the main marks. The marks may be recorded at different moments in time. Using a write-once material (a dye type like CD-R) the secondary marks can be recorded either before, during or after recording the main marks. In an embodiment for rewritable materials, the radiation control means 29,31 are provided with a specific non-erasing recording strategy. During writing phase change, materials usually an erasing power is applied in between recording marks for erasing any previously recorded marks. Hence, such write strategies enable a so-called direct over-write principle, which means that previously recorded data are erased during writing of new data (marks). To enable the erasure of previously written data, an erase power is provided in between the pulse trains with which the marks are written. The specific non-erasing recording strategy is adapted for writing marks in a part of the track that already contains secondary marks. In that case, for example no erasing power is applied in between the pulse trains for writing the marks. In an embodiment of the record carrier, the crystallization properties of the phase-change material are is specifically designed for obtaining a relatively slow crystallization behavior responding relatively slowly to writing radiation. This has the advantage that the secondary marks already recorded will not easily be erased by writing further marks in the same area of the track. In a further embodiment the secondary radiation control means 36 are provided with a specific secondary recording strategy for writing phase-change materials. The specific secondary recording strategy is adapted for writing secondary marks in a part of the track that already contains main marks. No erasing power is applied in between the write pulse trains for writing the secondary marks. It is to be noted that for writing the secondary marks a separate erasing step may be required for erasing any marks previously recorded. In another embodiment, the main marks and the secondary marks are simultaneously written in the disc during one write cycle. This is, for example, possible with a relatively slow phase-change materials, 'slow', meaning that the re-crystallization (erasure) of previously written marks, proceeds slowly. If the disc is written at a rather high recording velocity, it is possible to write the secondary marks simultaneously with the main marks by applying a rather high erase power in between the pulse trains for writing the main marks.

FIG. 3 shows secondary marks and reflection levels. In a lower part of the FIG. 3, main marks 40 and secondary marks 41 are shown. In an upper part of the FIG. 3, the resulting reflection is given. A first reflection level 42 is the highest reflection level corresponding to unrecorded parts of the track. The second reflection level 43 is lower and corresponds to a part of the track only having a secondary mark 41. The third reflection level 44 is the lowest and corresponds to a part of the track having main marks 40. The various levels of reflection are achieved by controlling the write power of a recording beam of radiation at appropriate power levels.

FIG. 4 shows a practical example of intensity of marks and secondary marks. The marks and secondary marks were written in a Blu-ray Disc at Blu-ray Disc recording conditions. In a first write cycle, long narrow I100 secondary marks were recorded at a recording velocity of 5.28 m/s, the I100 mark being 1920 ns long, which corresponds to a mark length of about 10000 nm. The secondary marks were written in the disc with low write power (1.5 mW). In a second write cycle, short I8 main marks were written in the same track with a much higher write power (5.5 mW), corresponding to the patterns shown in FIG. 3. The reflection trace of the resulting data pattern is shown in the left trace 50 in FIG. 4. The low frequency modulation was written with a block pattern, resulting in an abrupt change in the track reflection. In an embodiment of the write strategy a more gradual reflection transition is applied by gradually changing the write power. The result is shown in the right trace 51 in FIG. 4.

FIG. 5 shows a power spectrum of a written track. A first trace 52 of the measured track reflection corresponds to the I100-I8 pattern in the track is described above with FIG. 4. Two principle peaks at 260 kHz and 4.125 MHz are present corresponding to respectively the I100 and I8 carrier (the higher harmonics are also visible). Further, in a second trace 53 a spectrum with random data encoded in the secondary marks is shown in the figure. Data is superimposed on the I100 marks, and again the I100 frequency (and the higher harmonics) is clearly identified from the spectrum. The example illustrates that it is possible to separate the low-frequency components due to the secondary marks from the high-frequency main data.

FIG. 6 shows secondary marks, adapted main marks and reflection levels. A lower part of FIG. 6 shows main marks 40 in a part of the track without secondary marks and adapted main marks 45 in a part of the track having secondary marks 41. In an upper part of FIG. 6, the resulting reflection is given. A first reflection level 42 is the highest level corresponding to unrecorded parts of the track. The second reflection level 46 is lower and corresponds to a part of the track only having a secondary mark 41. The third reflection level 44 is again lower and corresponds to a part of the track only having main marks 40. The fourth reflection level 47 is the lowest and corresponds to a part of the track having adapted main marks 45. The main marks are adapted to be broader in the part of the track that also has the secondary marks.

FIG. 7 shows reflection of secondary marks and adapted main marks. A reflection trace 71 has a better symmetry of the signal, i.e. the differences between peak value and average are reduced considerably. The measured track reflection trace 71 corresponds to the pattern in the track described above with FIG. 6. In this case, in between the adapted main marks (at 6.2 mW write power) the secondary marks constitute "gray" spaces in between the main marks and were written with 1.5 mW power. In between the normal marks 40 (at 5.5 mW write power), "normal" white space were written (at bias-level power).

FIG. 8 shows a write strategy. A schematic lay-out of write-strategy 81 has power levels for writing a combination of main marks (HF) and secondary marks (LF). A resulting data signal 82 has LF modulation due to the secondary marks and modulation due to the HF main data. For recording a part of the track not having secondary marks, P1-level 83 is a nominal power-level for recording normal main marks, and P2-level 84 is a power-level for recording normal spaces (bias level). P3-level 85 is power level for recording wider main marks in a part of the track having a secondary mark, and P4-level 86 is a power level for recording secondary marks in between the main marks. In general, the power levels are related as follows: P2-level<P4-level<P1-level<P3-level. In an embodiment, the individual power-levels are tuned such as to minimize the asymmetry of the HF signal in both areas (P1-level, P2-level) and (P3-level, P4-level). The result of the write strategy is shown in FIG. 7 described above. In another embodiment, the change from (P1, P2) to (P3, P4) level-setting is made gradually. This has the effect of reducing bit-errors at boundaries.

Although the present system has been mainly explained by embodiments using optical discs of the phase change type, the present system is also suitable for other record carriers such as rectangular optical cards, magneto-optical discs or any other type of information storage system that writes marks in a track. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the present system may be implemented by means of both hardware and software, and that several 'means' or 'units' may be represented by the same item of hardware or software. Further, the scope of the present system is not limited to the embodiments, and the present system lies in each and every novel feature or combination of features described above.

The invention claimed is:

1. A device for recording information by writing marks in a track on a record carrier via a beam of radiation, the device comprising:

a head for providing the beam;

a radiation controller configured to control the beam to write the marks in a selected part of the track, the marks having a main mark intensity and a mark length within a predefined range of mark lengths: and a secondary radiation controller configured to control the beam to write secondary marks in the same selected part of the track, wherein the secondary marks having a secondary mark intensity that is substantially different from the main mark intensity and a length substantially longer than mark lengths in the predefined range, wherein the secondary radiation controller is adapted to control the beam to write a combination of the marks and the secondary marks during said recording of information, wherein the secondary radiation controller is adapted to control the beam to create the combination of the marks in which marks located at an area of track having a secondary mark, have a main mark intensity different from the main mark intensity of marks located at an area of the track not having a secondary mark, and wherein a scanning signal level difference between marks and intermediate spaces is substantially equal at both areas of the track.

2. The device as claimed in claim 1, wherein the secondary radiation controller is arranged to write the secondary marks by controlling a writing power of the radiation of the beam to secondary level that is substantially lower than a writing power for writing the marks.

3. The device as claimed in claim 1, wherein the secondary radiation controller is arranged to write the secondary marks by controlling the shape of the beam by an adjustable optical element.

4. A record carrier carrying information represented by marks in a track, the marks in at least a part of the track having a main mark intensity and a mark length within a predefined range of mark lengths, and the same part of the track further comprising secondary marks having a secondary mark intensity that is substantially different from the main mark intensity, and the secondary marks having a length substantially longer than mark lengths in the predefined range, wherein the marks located at an area of track having a secondary mark, have a main mark intensity different from the main mark intensity of marks located at an area of the track not having a secondary mark, and wherein a scanning signal level difference between marks and intermediate spaces is substantially equal at both areas of the track.

5. The record carrier as claimed in claim 4, wherein said different secondary mark intensity is constituted by the secondary marks being effectively narrower than the marks.

6. A method of recording information by writing marks in a track on a record carrier via a beam of radiation, the method comprising the acts of controlling the beam to write the marks in a selected part of the track, the marks having a main mark intensity and mark lengths within a predefined range of mark lengths, and controlling the beam to write secondary marks in the same selected part of the track, the secondary marks having a secondary mark intensity that is substantially different from the main mark intensity and a length substantially longer than mark lengths in the predefined range, wherein the marks located at an area of track having a secondary mark, have a main mark intensity different from the main mark intensity of marks located at an area of the track not having a secondary mark, and wherein said controlling writing the marks is performed at a first instance in time and writing the secondary marks is performed at a different instance in time during two separate scans of the selected part of the track.

7. A device for reading information represented by marks and additional information represented by secondary marks from a track on a record carrier via a beam of radiation, the marks having a main mark intensity and mark lengths within a predefined range of mark lengths, the secondary marks having a secondary mark intensity that is substantially different from the main mark intensity and a length outside the predefined range of mark lengths, and the marks and the secondary marks being in the same selected part of the track, the device comprising a head configured to provide the beam, a front-end unit configured to generate a scanning signal for detecting marks and secondary marks during said scanning, a read processing unit configured to retrieve the information from the scanning signal, and a secondary read unit configured to retrieve additional information encoded in the secondary marks from the scanning signal, wherein marks located at an area of track having a secondary mark, have a main mark intensity different from the main mark intensity of marks located at an area of the track not having a secondary mark, and wherein a scanning signal level difference between marks and intermediate spaces is substantially equal at both areas of the track.

8. A device for recording information by writing marks in a track on a record carrier via a beam of radiation, the device comprising a head configured to provide the beam, a radiation controller configured to control the beam to write the marks in a selected part of the track, the marks having a main mark intensity and a mark length within a predefined range of mark lengths, and a secondary radiation controller configured to control the beam to write secondary marks in the same selected part of the track, the secondary marks having a secondary mark intensity that is substantially different from the main mark intensity and a length substantially longer than mark lengths in the predefined range, wherein the secondary radiation controller is adapted to control the beam to create a combination of the marks and secondary marks, wherein the marks, located at an area of track having a secondary mark, have a main mark intensity different from the main mark intensity of marks located at an area of the track not having a secondary mark, and wherein a scanning signal level difference between marks and intermediate spaces is substantially equal at both areas of the track.

9. A method of recording information by writing marks in a track on a record carrier via a beam of radiation, the method comprising the acts of controlling the beam to write the marks in a selected part of the track, the marks having a main mark intensity and mark lengths within a predefined range of mark lengths, and controlling the beam to write secondary marks in the same selected part of the track, the secondary marks having a secondary mark intensity that is substantially different from the main mark intensity and a length substantially longer than mark lengths in the predefined range, wherein the marks located at an area of track having a secondary mark, have a main mark intensity different from the main mark intensity of marks located at an area of the track not having a secondary mark, and wherein a scanning signal level difference between marks and intermediate spaces is substantially equal at both areas of the track.

* * * * *